Patented Dec. 12, 1939

2,183,146

UNITED STATES PATENT OFFICE 2,183,146

PRODUCTION OF VALUABLE HYDROCARBONS AND THEIR DERIVATIVES CONTAINING OXYGEN

Wilhelm Michael, Ludwigshafen-on-the-Rhine, Germany, assignor to I. G. Farbenindustrie Aktiengesellschaft, Frankfort - on - the - Main, Germany No Drawing. Application May 4, 1938, Serial No. 205,983. In Germany May 5, 1937

5 Claims. (Cl. 260—449)

The present invention relates to the production of valuable hydrocarbons and their derivatives containing oxygen from carbon monoxide and hydrogen.

In the reaction of carbon monoxide and hydrogen to form liquid, solid and gaseous hydrocarbons or their derivatives containing oxygen it has already been proposed to use as catalysts compounds of heavy metals, in particular those of the 8th group of the periodic system. Generally speaking the catalysts are obtained by reduction of oxygen-containing compounds of the said metals. In the copending application Ser. No. 112,836 a process is described in which the conversion of the carbon monoxide with hydrogen is effected in the presence of a catalyst which is prepared by thermal treatment of a metal compound, preferably a compound of a metal from group 8 of the periodic system, at such a high temperature ranging above 500° C. but below the melting or sublimation point of the metal compound or metal resulting from this treatment and for such a long duration that a sintering of the catalyst takes place, the said thermal treatment being effected in combination with a reducing treatment.

In the further copending application Ser. No. 172,238, filed November 1st, 1937, further particulars of the said process are described. The treatment of the iron compounds is effected at such high temperatures above 600° C., preferably above 700° C., but below the melting or sublimation point of the particular compound employed or of the resulting iron, and for such a long time that at least partial sintering of the iron compound or the iron takes place, the catalysts being also subjected to a treatment with reducing gases before their use in the said conversion of carbon monoxide and hydrogen, preferably before the completion of the said thermal treatment at temperatures above 600° C. The treatment with the reducing gases may be effected during the said thermal treatment; it is preferably carried so far that the iron compounds employed are completely reduced to the metal.

I have now found that very active and stable catalysts for the said reaction of carbon monoxide with hydrogen are obtained by subjecting metals of the iron group, which have been formed by decomposition of their carbonyl compounds, preferably carbonyl iron, to a thermal treatment as referred to above at temperatures above 500° C. until at least a partial sintering has taken place. By partial sintering is meant the agglomeration, by the action of heat, of originally separated solid particles into coherent masses having a substantial porosity. If the masses become substantially non-porous by the heating the sintering is complete. Though also such substantially non-porous catalysts may be employed porous catalysts are preferred, and it is therefore of advantage to effect only a partial sintering. Contrasted with the flaky metals used directly after decomposition of carbonyl compounds as catalysts according to a prior proposal and which are active for only a short time, the catalysts prepared according to this invention have a considerably greater stability.

The sintering may be carried out for example at 600°, 700°, 800° or 1000° C. or higher, but below the melting point of the metal treated. It is preferable to work in a non-oxidizing atmosphere, in particular in a reducing atmosphere, or also in vacuo. The heating may also be carried out practically without the use of gases if the vessel serving for the heating be filled as far as possible with the metal and then closed and heated. Generally speaking it is advantageous to carry out the heating of the metals in the presence of gases, in particular reducing gases, as for example hydrogen or gases containing or supplying hydrogen.

The operation may also be carried out in two or more stages; for example the first stage may be carried out below 500° C. in the presence of reducing gases and the second or subsequent stages at temperatures above 500° C. in the presence of non-reducing and non-oxidizing gases, as for example nitrogen, or in vacuo.

The heating of the metals is advantageously effected at atmospheric pressure, but reduced or increased pressures, as for example 2, 5, 20, 100 atmospheres or more, may be used.

The activity of the catalysts may be increased by first superficially oxidizing them with oxidizing gases and then treating them with reducing gases and either simultaneously with the latter treatment or subsequently sintering them at temperatures above 500° C.

The activity may also be increased by the addition of other substances. As activating additions there may be mentioned aluminum oxide and hydroxide or silicon dioxide (for example in the form of kieselguhr) and also compounds of copper, titanium, manganese, tungsten, molybdenum, chromium, thorium, cerium, zirconium or other rare earths or two or more of these substances together. Small amounts of alkalies or alkaline earths may also favourably influence the formation of liquid and solid hydrocarbons.

It is of special advantage to start from iron obtained from its carbonyl compounds for the preparation of the catalysts, but also nickel or cobalt obtained from their carbonyl compounds may be employed.

The said catalysts may be readily and repeatedly regenerated, as for example by heating with oxidizing gases and subsequent reduction.

The reaction of the carbon monoxide with hydrogen may be carried out at temperatures above 150° C. and at atmospheric, increased or reduced pressure. It is preferable to work at temperatures between 200° and 450° C. and under increased pressure, as for example at 5, 10, 20, 50, 100 atmospheres or more.

The products resulting from the conversion of carbon monoxide and hydrogen in the presence of the abovementioned catalysts are those generally obtained in the said conversion, namely mainly hydrocarbons containing more than one carbon atom in the molecule, which are to a large extent liquid and/or solid, and/or liquid or solid oxygen-containing derivatives of hydrocarbons, such as methanol or higher alcohols (for example isobutyl alcohol), ketones, aldehydes and the like.

The following example will further illustrate the nature of this invention but the invention is not restricted to this example.

Example

Iron powder which has been obtained by thermal decomposition of iron carbonyl is pressed into pills and heated at 850° C. in the presence of hydrogen for several hours, whereby the pills sinter to a density of from about 7.0 to 7.5. A mixture of carbon monoxide and hydrogen in the ratio of 1:2 is led over the catalyst thus prepared at 320° C. under a pressure of 15 atmospheres. There is thus formed, in addition to small amounts of oxygen-containing compounds, a very good yield of liquid and solid hydrocarbons. The gas leaving the reaction chamber contains considerable amounts of gaseous unsaturated hydrocarbons, in particular ethylene.

What I claim is:

1. A process for the conversion of carbon monoxide and hydrogen into substances selected from the group consisting of liquid, solid and gaseous hydrocarbons which comprises contacting the said carbon monoxide and hydrogen at a reacting temperature with a catalyst prepared by thermally treating a metal of the iron group which has been obtained by decomposition of a carbonyl compound of this metal at such a high temperature above 500° C., but below the melting point of the said metal, and for such a long time that at least partial sintering of the said metal takes place.

2. In the process as claimed in claim 1, in which iron is the metal of the iron group.

3. In the process as claimed in claim 1, effecting the thermal treatment of the metal of the iron group in a non-oxidizing atmosphere.

4. In the process as claimed in claim 1, effecting the thermal treatment of the metal of the iron group in a reducing atmosphere.

5. In the process as claimed in claim 1, effecting the thermal treatment of the metal of the iron group after superficial oxidation in a reducing atmosphere.

WILHELM MICHAEL.